United States Patent
Heo et al.

(10) Patent No.: US 10,483,578 B2
(45) Date of Patent: Nov. 19, 2019

(54) METHOD FOR MANUFACTURING ANODE SUPPORT OF SOLID OXIDE FUEL CELL, AND ANODE SUPPORT OF SOLID OXIDE FUEL CELL

(71) Applicant: LG CHEM, LTD., Seoul (KR)

(72) Inventors: Yeonhyuk Heo, Daejeon (KR); Kwangwook Choi, Daejeon (KR); Jongjin Lee, Daejeon (KR); Takkeun Oh, Daejeon (KR); Bu Won Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 444 days.

(21) Appl. No.: 14/910,574

(22) PCT Filed: Oct. 2, 2014

(86) PCT No.: PCT/KR2014/009347
§ 371 (c)(1),
(2) Date: Feb. 5, 2016

(87) PCT Pub. No.: WO2015/050409
PCT Pub. Date: Apr. 9, 2015

(65) Prior Publication Data
US 2016/0211541 A1    Jul. 21, 2016

(30) Foreign Application Priority Data
Oct. 2, 2013 (KR) .................. 10-2013-0118028

(51) Int. Cl.
*H01M 8/1226* (2016.01)
*H01M 8/1246* (2016.01)
(Continued)

(52) U.S. Cl.
CPC ....... *H01M 8/1226* (2013.01); *H01M 4/8803* (2013.01); *H01M 4/8817* (2013.01);
(Continued)

(58) Field of Classification Search
None
See application file for complete search history.

(56) References Cited

U.S. PATENT DOCUMENTS

2002/0041991 A1*  4/2002  Chan .................. C23C 18/04
                                                    429/506
2007/0077476 A1   4/2007  Lee et al.
(Continued)

FOREIGN PATENT DOCUMENTS

EP      1344271      9/2003
EP      1532711      5/2005
(Continued)

OTHER PUBLICATIONS

Xiao-Feng Ye et al., "Improvement of Cu—CeO$_2$ anodes for SOFCs running on ethanol fuels", Solid State Ionics, 2009, p. 276-281, vol. 180, Elsevier B.V.
(Continued)

*Primary Examiner* — Rena Dye Cronin

(57) ABSTRACT

The present application relates to a method of manufacturing an anode support of a solid oxide fuel cell and an anode support of a solid oxide fuel cell, and may improve performance and durability of the fuel cell by improving an interfacial property between the anode support and an electrolyte.

9 Claims, 3 Drawing Sheets

(51) Int. Cl.
*H01M 4/88* (2006.01)
*H01M 8/0236* (2016.01)
*H01M 8/124* (2016.01)

(52) U.S. Cl.
CPC ....... *H01M 8/0236* (2013.01); *H01M 8/1246* (2013.01); *H01M 2008/1293* (2013.01)

(56) References Cited

U.S. PATENT DOCUMENTS

| | | | | |
|---|---|---|---|---|
| 2012/0009504 | A1* | 1/2012 | Ramanathan | H01M 4/8621 429/532 |
| 2012/0021333 | A1* | 1/2012 | Hwang | C04B 35/47 429/486 |
| 2012/0088180 | A1* | 4/2012 | Heo | H01M 4/8867 429/481 |
| 2014/0051006 | A1* | 2/2014 | Hwang | H01M 8/1097 429/481 |

FOREIGN PATENT DOCUMENTS

| | | |
|---|---|---|
| JP | 2008-293828 A | 12/2008 |
| JP | 2011-249186 A | 12/2011 |
| KR | 10-2002-0081143 A | 11/2002 |
| KR | 10-2007-0037254 A | 4/2007 |
| KR | 10-2013-0042869 A | 4/2013 |
| KR | 10-2013-0092368 A | 8/2013 |
| WO | WO 02/058169 A2 | 7/2002 |
| WO | WO 2004/051783 A1 | 6/2004 |

OTHER PUBLICATIONS

Extended European Search Report for EP Application No. 14850362.6 dated Apr. 5, 2017.
Office Action for Korean Patent Application No. 10-2014-0133571 dated Apr. 20, 2016.
International Search Report and Written Opinion for PCT/KR2014/009347 filed on Oct. 2, 2014.
Rainer Kungas et al., "Restructuring Porous YSZ by Treatment in Hydrofluoric Acid for Use in SOFC Cathodes", Journal of the American Ceramic Society, Jul. 2011, pp. 2220-2224, vol. 94, No. 7, The American Ceramic Society.
Hyuk Kim et al., "Fabrication of Highly Porous Yttria-Stabilized Zirconia by Acid Leaching Nickel from a Nickel-Yttria-Stabilized Zirconia Cermet", Journal of the American Ceramic Society, Jun. 2002, pp. 1473-1476, vol. 85, No. 6, The American Ceramic Society.
Korean Office Action for Application No. 10-2014-0133571, dated Oct. 16, 2015.

* cited by examiner

[Figure 1]
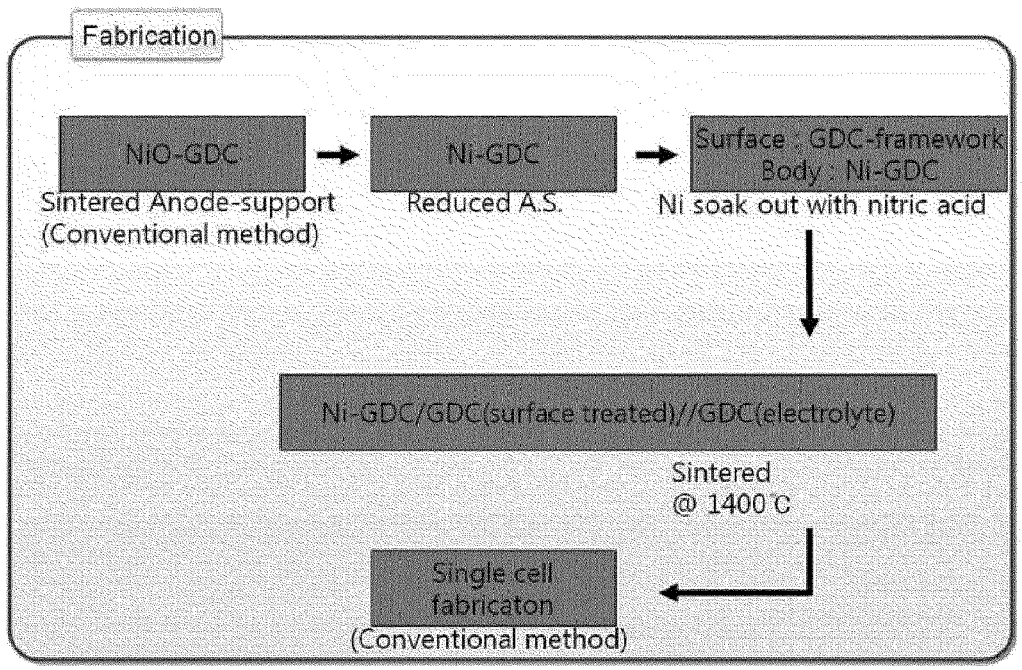
[Figure 2]
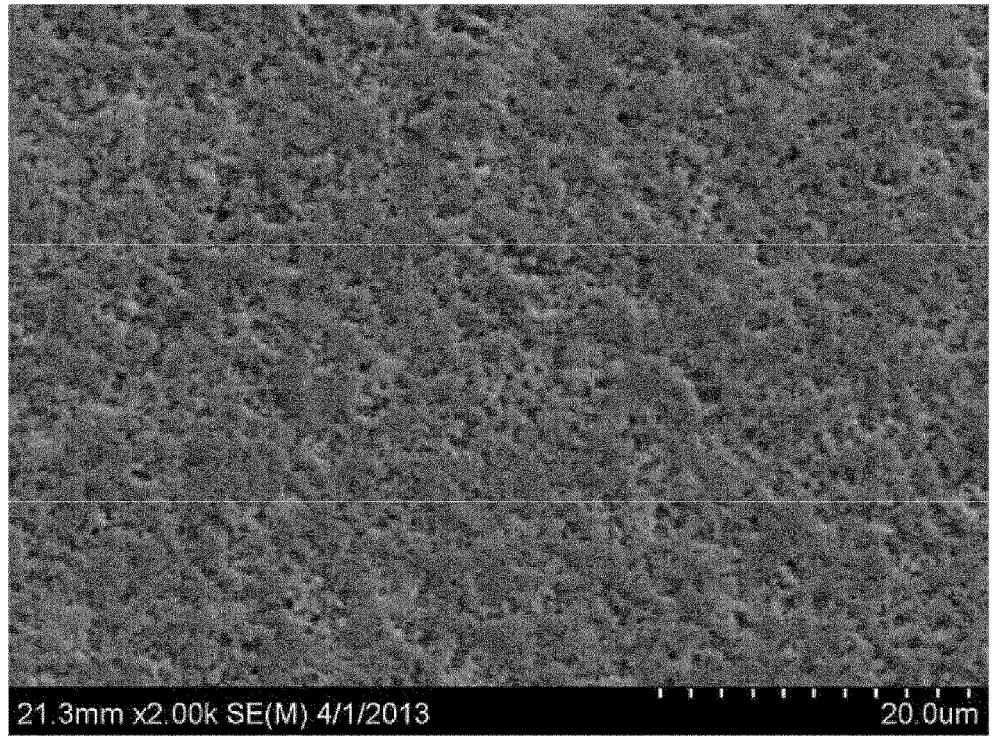

[Figure 3]
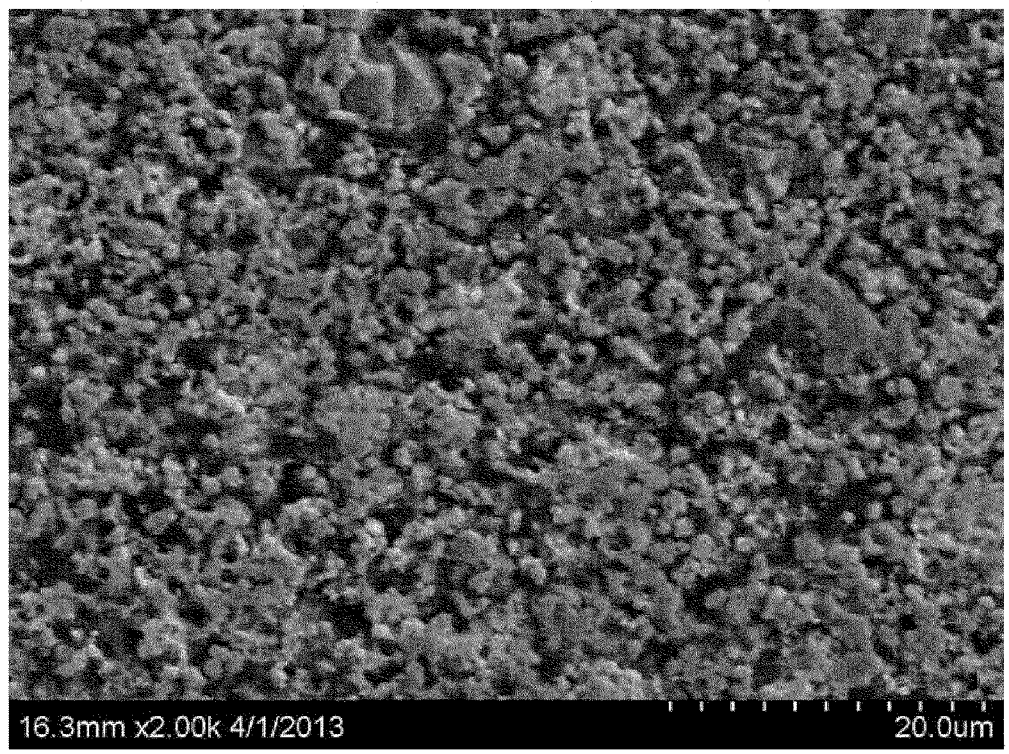
[Figure 4]
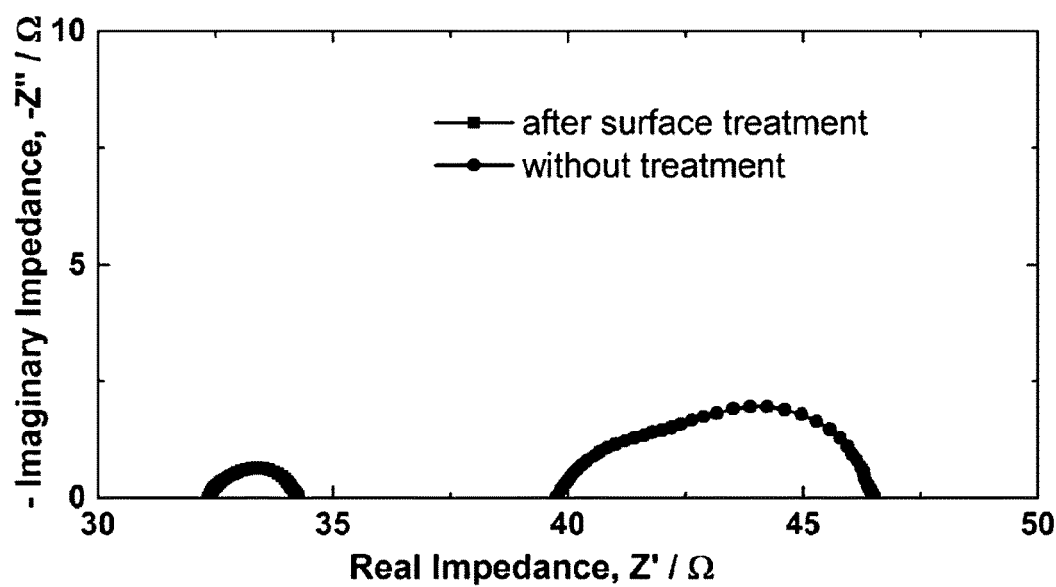

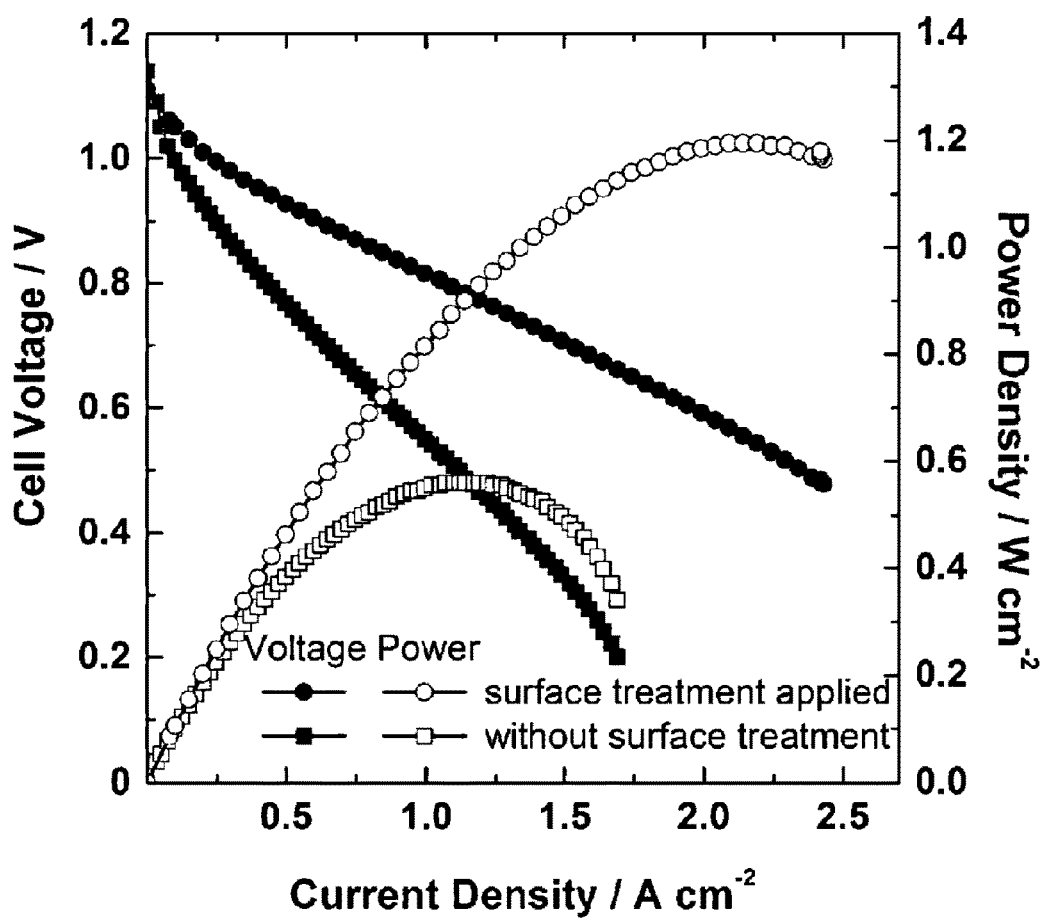
[Figure 5]

METHOD FOR MANUFACTURING ANODE SUPPORT OF SOLID OXIDE FUEL CELL, AND ANODE SUPPORT OF SOLID OXIDE FUEL CELL

TECHNICAL FIELD

This application is a U.S. National Stage of International Patent Application No. PCT/KR2014/009347 filed Oct. 2, 2014, which claims priority to and the benefit of Korean Patent Application No. 10-2013-0118028 filed in the Korean Intellectual Property Office on Oct. 2, 2013, the entire contents of which are incorporated herein by reference.

The present application relates to a method of manufacturing an anode support of a solid oxide fuel cell, and an anode support of a solid oxide fuel cell.

BACKGROUND ART

A fuel cell is an apparatus directly converting chemical energy of fuel and air into electricity and heat by an electrochemical reaction. The fuel cell, unlike an electric power generation technology in the related art adopting fuel combustion, steam generation, turbine driving, and generator driving processes, does not have a combustion process or a driving apparatus, and thus the fuel cell is a novel concept of electric power generation technology having high efficiency and not causing an environmental problem. This fuel cell has merits in that since air pollution materials such as Sox and NOx are hardly emitted and carbon dioxide is less produced, pollution-free electric power generation, low noise, and no vibration are attained.

Examples of the fuel cell include various kinds such as a phosphoric acid fuel cell (PAFC), an alkaline fuel cell (AFC), a polymer electrolyte fuel cell (PEMFC), a direct methanol fuel cell (DMFC), and a solid oxide fuel cell (SOFC), and among the fuel cells, the solid oxide fuel cell (SOFC) has high electric power generation efficiency because of a low overvoltage and a small irreversible loss based on low activation polarization. Further, since in addition to hydrogen, carbon or hydrocarbon-based fuel may be used, a width of fuel selection is wide, and since a reaction speed in an electrode is high, an expensive precious metal as an electrode catalyst is not required. Moreover, heat emitted to be concomitant with electric power generation has a very high temperature, and thus a utility value thereof is high. Heat generated in the solid oxide fuel cell may be used to reform fuel, and may be used as an energy source for industries or cooling in steam supply and power generation.

The solid oxide fuel cell may be classified into an anode support type, a cathode support type, an electrolyte support type, and the like according to a relative thickness of a support. The anode support type SOFC has a merit in that since electric conductivity of an anode is high, even though the anode support type SOFC becomes a thick support type, current resistance is not large.

Therefore, there is a demand for developing a technology for improving performance of an anode support type solid oxide fuel cell and durability of the fuel cell.

DETAILED DESCRIPTION OF THE INVENTION

Technical Problem

The problem to be solved by the present application is to provide an anode support where an interfacial property between the anode support and an electrolyte of a solid oxide fuel cell is improved to increase a substantial area in which a hydrogen oxidation reaction occurs at an anode and thus improve performance of the fuel cell and a delamination phenomenon of an interface is prevented to improve durability of the cell, and a method of manufacturing the same.

Further, another problem to be solved by the present application is to provide a solid oxide fuel cell including the aforementioned anode support, and a method of manufacturing the same.

The problems to be solved by the present application are not limited to the aforementioned technical problems, and other unmentioned technical problems may be clearly understood by a person with skill in the art from the following description.

Technical Solution

An exemplary embodiment of the present application provides a method of manufacturing an anode support of a solid oxide fuel cell, the method including: contacting an acidic solution with at least one surface of the anode support including a metal and an inorganic oxide having oxygen ion conductivity to treat the surface.

Another exemplary embodiment of the present application provides a method of manufacturing a solid oxide fuel cell, the method including: preparing an anode support by using the aforementioned manufacturing method; and applying an inorganic oxide having ion conductivity on a surface-treated surface of the anode support to form an electrolyte.

Yet another exemplary embodiment of the present application provides an anode support of a solid oxide fuel cell manufactured by the aforementioned manufacturing method.

Still another exemplary embodiment of the present application provides an anode support of a solid oxide fuel cell including: a metal, and an inorganic oxide having oxygen ion conductivity, in which a portion including at least one surface of the anode support has a porous structure having porosity of 5% or more and 50% or less and a pore size of 0.1 micrometers or more and 1 millimeter or less, and the porous structure exists in a content of 5 vol % or more and 50 vol % or less based on the entire anode support.

Still yet another exemplary embodiment of the present application provides a method of manufacturing a solid oxide fuel cell, the method including: preparing the anode support; and applying an inorganic oxide having ion conductivity on a surface-treated surface of the anode support to form an electrolyte.

A further exemplary embodiment of the present application provides a solid oxide fuel cell including: the anode support; a cathode positioned to face the anode support; and an electrolyte positioned between the anode support and the cathode.

Advantageous Effects

In an anode support of a solid oxide fuel cell according to an exemplary embodiment of the present application, it is possible to improve performance of the fuel cell by improving an interfacial property between electrolytes. Further, there are merits in that it is possible to prevent a delamination phenomenon of an interface between the anode support and the electrolyte and thus slow down a reduction speed of efficiency of the fuel cell and improve durability of the cell.

BRIEF DESCRIPTION OF DRAWINGS

FIG. 1 illustrates a step view of a method of manufacturing a fuel cell according to Preparation Example 1.

FIG. 2 illustrates a scanning electron microscope (SEM) photograph of an anode surface that is not surface-treated according to Comparative Example 1.

FIG. 3 illustrates a scanning electron microscope (SEM) photograph of an anode surface that is surface-treated according to Example 1.

FIG. 4 illustrates a measurement result of an area specific resistance according to Test Example 1.

FIG. 5 illustrates a measurement result of performance of a cell according to Test Example 2.

BEST MODE

Advantages and characteristics of the present application, and methods for achieving them will be apparent by referring to embodiments described below in detail in addition to the accompanying drawings. However, the present application is not limited to the exemplary embodiments to be disclosed below but may be implemented in various different forms. Therefore, the exemplary embodiments introduced herein are provided to make disclosed contents of the present application thorough and complete and sufficiently transfer the spirit of the present invention to those skilled in the art, and the present application is just defined by the scope of the appended claims. The sizes and the relative sizes of constituent elements shown in the drawings may be exaggerated for clarity of description.

Unless otherwise defined, all terms used in the present specification, including technical or scientific terms, have the same meanings as those commonly understood by those with ordinary skill in the technical field to which the present application belongs. Further, terms defined in a generally used dictionary are not interpreted to have ideal or excessively formal meanings unless clearly defined in the present invention.

Hereinafter, the present application will be described in detail.

One exemplary embodiment of the present application provides a method of manufacturing an anode support of a solid oxide fuel cell, the method including: contacting an acidic solution with at least one surface of the anode support including a metal and an inorganic oxide having oxygen ion conductivity to treat the surface.

At least one surface may mean a surface contacting with an electrolyte, and may be a portion or the entirety of the surface.

The surface-treated surface may be a portion contacting with the electrolyte.

The anode support serves to electrochemically oxidize fuel and transport electrons.

The method of manufacturing the anode support may further include reducing a metal oxide into the metal in the anode support including the metal oxide and the inorganic oxide having the oxygen ion conductivity.

The metal oxide may be reduced by using a general method publicly known in the art, and, for example, may be reduced at a temperature of 500° C. or more and 900° C. or less under a reducing gas, for example, a hydrogen gas atmosphere. In the case where the temperature is 500° C. or more, a smooth reduction reaction may occur, and in the case where the temperature is 900° C. or less, densification of the anode at high temperatures may be prevented, and the occurrence of agglomeration of a nickel metal at high temperatures may be prevented.

A pH of the acidic solution may be 1 to 6, and the acidic solution may be specifically a solution including any one selected from the group consisting of a nitric acid, a hydrochloric acid, a sulfuric acid, and an acetic acid, and more specifically, a nitric acid solution.

The metal may be one or two or more selected from the group consisting of Zr, Ce, Ti, Mg, Al, Si, Mn, Fe, Co, Ni, Cu, Zn, Mo, Y, Nb, Sn, La, Ta, V, and Nd. Preferably, Ni may be used. Ni may have high electron conductivity and simultaneously may adsorb hydrogen and hydrocarbon-based fuel to attain high electrode catalyst activity. Further, Ni has a merit as a material for electrodes in that as compared to platinum and the like, cost thereof is low.

The inorganic oxide having the oxygen ion conductivity may be one or two or more selected from the group consisting of gadolinium doped ceria (GDC), gadolinium doped zirconia (GDZ), samarium doped ceria (SDC), samarium doped zirconia (SDZ), yttrium doped ceria (YDC), yttrium doped zirconia (YDZ), yttria stabilized zirconia (YSZ), and scandia stabilized zirconia (ScSZ). Preferably, the inorganic oxide may be one or two or more selected from the group consisting of gadolinium doped ceria (GDC), gadolinium doped zirconia (GDZ), samarium doped ceria (SDC), samarium doped zirconia (SDZ), yttrium doped ceria (YDC), yttrium doped zirconia (YDZ), and scandia stabilized zirconia (ScSZ). More preferably, gadolinium doped ceria (GDC) may be used. In the case where GDC is used, there is a merit in that the fuel cell is operated at intermediate and low temperatures of about 500° C. to 700° C. In the case where the material, such as GDC, having the ion conductivity that is higher than that of the inorganic oxide such as YSZ is used, cell efficiency (output) may be increased. Accordingly, a high output value may be attained at the intermediate and low temperatures. In the case where the fuel cell is operated at the intermediate and low temperatures of about 500° C. to 700° C., since a degeneration speed of the cell is rapidly decreased and costs of other constitutional elements other than the cell may be reduced, advantageous effects may be attained in terms of long-term stability and a cost reduction.

A portion including the surface-treated surface has a porous structure having porosity of 5% or more and 50% or less and a pore size of 0.1 micrometers or more and 1 millimeter or less, and the porous structure may exist in a content of 5 vol % or more and 50 vol % or less based on the entire anode support.

The portion including the surface-treated surface may have the porosity of 35% or more and 50% or less. The portion including the surface-treated surface may have the pore size of 0.1 micrometers or more and 1 millimeter or less. The porous structure may exist in a content of 35 vol % or more and 50 vol % or less based on the entire anode support. When the content is in the aforementioned range, electric connection may be sufficiently performed and hydrogen may be smoothly moved.

The pore size of the portion including the surface-treated surface may be adjusted according to a kind of pore formers such as carbon blacks and polymers.

The portion including the surface-treated surface may mean a portion formed by surface-treating in the anode support.

When the anode support is manufactured, in the case where surface-treating is performed by contacting the anode support with the acidic solution, the surface area of the support may be increased by 2 times to 10 times as compared to the case where surface-treating is not performed. By increasing the surface area, there is an effect of increasing a triple phase boundary (TPB) and improving performance of the fuel cell. Further, there is an effect of preventing a delamination phenomenon of an interface.

A roughness of the surface-treated surface may be 200 nanometers or more and 1,000 nanometers or less. In the case where the roughness is 200 nanometers or more, it is preferable for performing surface-treating of the anode support, and in the case where the roughness is 1,000 nanometers or less, strength of the anode support may be prevented from being remarkably weakened.

The roughness means a center line average roughness (Ra: arithmetical average roughness). The center line average roughness is a value obtained by averaging heights and depths of mountains and valleys in a reference length based on the center line, and means a distance between the center line and an average line. The center line represents, in the reference length, when an average cross-section curved line and a horizontal straight line are drawn, the straight line when areas surrounded by the straight line and the cross-section curved line are the same as each other.

The surface roughness may be measured by any method as long as the method is known in the corresponding field, and for example, may be measured by using an optical profiler.

An area specific resistance (ASR) of the surface-treated surface may be 0.01 $\Omega cm^2$ or more and 0.5 $\Omega cm^2$ or less. In this case, the area specific resistance may be measured by any method as long as the method is known in the corresponding field, and for example, may be measured by a high temperature impedance method.

The thickness of the anode support may be generally 0.1 millimeters or more and 10 millimeters or less. More specifically, the thickness may be 1 millimeter or more and 5 millimeters or less.

Among the aforementioned materials of the anode support, one kind may be used alone, two kinds or more may be used while being mixed, the anode support may be formed alone, an additional anode may be further formed on the anode support, and an anode having a multilayered structure may be further formed by using different anode materials. Alternatively, in the anode support, in order to delay densification of the anode support during sintering, as the metal oxide and the inorganic oxide having the hydrogen ion conductivity that are starting materials, coarse particles of several micrometers or more may be used. In this case, since after sintering, the triple phase boundary (TPB) where a gas reaction occurs in the anode may not be sufficiently formed, a functional layer (FL) having the same composition as the anode support and the small particle size may be further included between the anode support and the electrolyte.

One exemplary embodiment of the present application provides an anode support of a solid oxide fuel cell manufactured by the aforementioned manufacturing method.

One exemplary embodiment of the present application provides an anode support of a solid oxide fuel cell including: a metal, and an inorganic oxide having oxygen ion conductivity, in which a portion including at least one surface of the anode support has a porous structure having porosity of 5% or more and 50% or less and a pore size of 0.1 micrometers or more and 1 millimeter or less, and the porous structure exists in a content of 5 vol % or more and 50 vol % or less based on the entire anode support.

A roughness of the surface where the porous structure exists in the anode support may be 200 nanometers or more and 1,000 nanometers or less.

An area specific resistance (ASR) of the surface where the porous structure exists in the anode support may be 0.01 $\Omega cm^2$ or more and 0.5 $\Omega cm^2$ or less.

The surface where the porous structure exists in the anode support is a portion contacting with an electrolyte.

A description of the metal, the inorganic oxide, the porous structure, the roughness, and adhesion strength is the same as that described in the above.

One exemplary embodiment of the present application provides a solid oxide fuel cell including: an anode support; a cathode positioned to face the anode support; and an electrolyte positioned between the anode support and the cathode.

One exemplary embodiment of the present application provides a method of manufacturing a solid oxide fuel cell, the method including: preparing an anode support by using the aforementioned manufacturing method; and applying an inorganic oxide having ion conductivity on a surface-treated surface of the anode support to form an electrolyte.

The inorganic oxide included in the electrolyte may be the same as the inorganic oxide included in the anode support.

One exemplary embodiment of the present application provides a method of manufacturing a solid oxide fuel cell, the method including: preparing the anode support; and applying an inorganic oxide having ion conductivity on a surface-treated surface of the anode support to form an electrolyte.

The inorganic oxide included in the electrolyte may be the same as the inorganic oxide included in the anode support. The electrolyte should be dense so that air and fuel are not mixed, the oxygen ion conductivity should be high, and the electron conductivity should be low. Further, the anode and the cathode having a very large oxygen partial pressure difference are positioned at both sides of the electrolyte, and thus in a wide oxygen partial pressure region, the aforementioned physical properties need to be maintained.

The electrolyte is not particularly limited as long as the electrolyte is generally used in the corresponding technical field, and for example, may include one or more selected from the group consisting of zirconias doped or not doped by at least one of gadolinium, yttrium, samarium, scandium, calcium, and magnesium; cerias doped or not doped by at least one of gadolinium, samarium, lanthanum, ytterbium, and neodymium; bismuth oxides doped or not doped by at least one of calcium, strontium, barium, gadolinium, and yttrium; and lanthanum gallates doped or not doped by at least one of strontium and magnesium. More specifically, the electrolyte may be one or more selected from the group consisting of gadolinium doped ceria (GDC), gadolinium doped zirconia (GDZ), samarium doped ceria (SDC), samarium doped zirconia (SDZ), yttrium doped ceria (YDC), yttrium doped zirconia (YDZ), yttria stabilized zirconia (YSZ), and scandia stabilized zirconia (ScSZ).

The thickness of the electrolyte may be generally 10 nanometers or more and 100 micrometers or less. More specifically, the thickness may be 100 nanometers or more and 50 micrometers or less.

As a method of forming the electrolyte in the anode support, a typical slurry coating method including dip-coating and painting; a tape casting method; a screen printing method; a wet spray method; or a vacuum deposition method such as a chemical vapor deposition method and a physical vapor deposition method may be used.

The electrolyte may be heat-treated to be sintered. A heat-treating temperature may be 800° C. or more and 1,500° C. or less.

The method of manufacturing the solid oxide fuel cell may further include applying a cathode composition on an electrolyte to form a cathode.

The cathode of the fuel cell means a layer where an electrochemical reaction occurs in the fuel cell by an oxygen reduction catalyst. An oxygen gas is reduced into oxygen ions, and air continuously flows to the cathode to maintain a constant oxygen partial pressure.

As the oxygen reduction catalyst, for example, metal oxide particles having a perovskite type crystal structure may be used, and specifically, the oxygen reduction catalyst may be any one or a mixture of two or more selected from the group consisting of lanthanum-strontium manganese oxide (LSM), lanthanum-strontium iron oxide (LSF), lanthanum-strontium cobalt oxide (LSC), lanthanum-strontium cobalt iron oxide (LSCF), samarium-strontium cobalt oxide (SSC), barium-strontium cobalt iron oxide (BSCF), and bismuth-ruthenium oxide.

As the material forming the cathode, precious metals such as platinum, ruthenium, or palladium may be used. Among the aforementioned cathode materials, one kind may be used alone, two kinds or more may be used while being mixed, and a cathode having a single layer structure or a cathode having a multilayered structure using different cathode materials may be formed.

The cathode composition may further include an inorganic oxide having oxygen ion conductivity, a binder resin, and a solvent.

The binder resin is not limited as long as the binder resin may provide adhesion strength, and for example, may be ethyl cellulose.

The solvent is not limited as long as the solvent may dissolve the binder resin, and may be any one kind or two kinds or more selected from the group consisting of butyl carbitol, terpineol, and butyl carbitol acetate.

The cathode composition may be heat-treated to be sintered. A heat-treating temperature may be 800° C. or more and 1,200° C. or less. In the case where the temperature is 800° C. or more, the oxygen reduction catalyst may be sintered together with the inorganic oxide, and in the case where the temperature is 1,200° C. or less, the oxygen reduction catalyst may be sintered while not being reacted with the electrolyte.

The thickness of the cathode may be generally 1 micrometer or more and 100 micrometers or less. More specifically, the thickness may be 5 micrometers or more and 50 micrometers or less.

As a method of forming the cathode in the electrolyte, a tape casting method, a screen printing method, or a wet spray method may be used.

Between the cathode and the solid oxide electrolyte, if necessary, in order to more effectively prevent a reaction between there, a functional layer may be further included. As this functional layer, for example, at least one selected from the group consisting of gadolinium doped ceria (GDC), samarium doped ceria (SDC), and yttrium doped ceria (YDC) may be included. The thickness of the functional layer may be in the range of 1 micrometer or more and 50 micrometers or less, and for example, 2 micrometers or more and 10 micrometers or less.

The solid oxide fuel cell may be manufactured by using a general method publicly known in various kinds of documents in the corresponding technical field. Further, the solid oxide fuel cell may be applied to various structures such as a tubular stack, a flat tubular stack, and a planar type stack.

Hereinafter, the present application will be specifically described with reference to Examples and Comparative Examples. However, the Examples according to the present application may be modified in various other forms, and the scope of the present application is not interpreted to be limited to the Examples as will be described in detail below.

The Examples of the present application are provided to more fully describe the present application to the person with ordinary skill in the art.

Example 1

The anode support having the thickness of 3 millimeters while the volume ratio of GDC (10 mole % Gd doped Ceria) and NiO was 50:50, was manufactured by the uniaxial pressing method and sintered at the temperature of 1,450° C. Thereafter, at the temperature of 850° C., NiO/GDC were reduced into Ni/GDC by using the reduction gas ($H_2$) for 30 minutes.

One surface of the Ni/GDC anode support was immersed in the nitric acid solution having the pH of 1.2 to be etched to the depth of 1 millimeter. In this case, by surface-treating, the porous structure having the porosity of 48% and the pore size of 1 micrometer was formed in the content of 48% based on the total volume of the anode support.

In this case, the roughness of the surface was 300 nanometers when measured by using the optical profiler. The SEM picture of the surface of the anode support according to Example 1 is illustrated in FIG. 3.

Comparative Example 1

In Example 1, in the case where surface-treating using the nitric acid was not performed, the porous structure did not exist on the surface, and the surface roughness was 100 nanometers. The SEM picture of the surface of the anode support according to Comparative Example 1 is illustrated in FIG. 2.

FIG. 2 is a view obtained by photographing the surface of the anode support of Comparative Example 1, which is not surface-treated, by the scanning electron microscope (SEM), and FIG. 3 is a view obtained by photographing the surface of the anode support of Example 1, which is surface-treated, by the scanning electron microscope (SEM).

As compared to FIG. 2, it can be confirmed through FIG. 3 that the anode support includes a plurality of pores and the pore size is large. That is, it can be confirmed that the surface of the anode support according to Example 1 has high porosity and a large pore size.

Accordingly, in the anode support according to Example 1, since the surface area may be increased due to surface-treating to increase the number of sites at which fuel may be reacted, ultimately, output (efficiency) of the cell may be increased.

Preparation Example 1

On the surface of the anode support manufactured in Example 1, which was treated by the nitric acid, GDC was applied in the thickness of 10 micrometers by the dip coating method, followed by sintering at the temperature of 1,450° C. to form the electrolyte. On the electrolyte, LSCF was applied in the thickness of 30 micrometers by the screen printing method, followed by sintering at the temperature of 1,000° C. to form the cathode layer and thus manufacture the fuel cell.

The method of manufacturing the fuel cell according to Preparation Example 1 is schematically illustrated in FIG. 1. Referring to FIG. 1, the prepared NiO-GDC anode support may be reduction-treated to form the Ni-GDC type metal complex material, and thereafter, if the surface is acid-treated, only the Ni metal is selectively melted, and thus an effect of increasing the surface area may be expected. In a state where surface-treating is finished, if the electrolyte is applied and high temperature sintering is performed, an interfacial state with the electrolyte is excellent and an area in which hydrogen is actually reacted is increased, and thus, ultimately, efficiency of the cell may be increased.

Preparation Example 2

The fuel cell was manufactured by using the anode support of Comparative Example 1 by the same method as the method of Preparation Example 1.

Test Example 1

By measuring impedances by the fuel cells of Preparation Examples 1 and 2, the area specific resistances were measured in order to compare cell durability of the surfaces. The measurement result thereof is illustrated in FIG. 4.

FIG. 4 illustrates the area specific resistance (ASR) value generally measured by the alternating current impedance method confirming the interfacial property between the electrolyte and the electrode. In FIG. 4, the arc illustrated on the left side is the measured value for the cell of Preparation Example 1 using the surface-treated anode support, and the arc illustrated on the right side is the measured value for the cell of Preparation Example 2 using the anode support that is not surface-treated. The size of the arc represents the ASR value, and it can be confirmed that the left arc represents the ASR value at the level of about ⅓ of that of the right arc. Accordingly, it can be confirmed that the fuel cell according to Preparation Example 1 may have higher efficiency.

Test Example 2

Cell performance data tested by the I-V-P method were measured by using the fuel cells of Preparation Examples 1 and 2. The cell performance measurement result thereof is illustrated in FIG. 5.

FIG. 5 illustrates the I-V-P curved line generally measuring output (efficiency) of the fuel cell. It can be seen that the cell (about 1.2 W) of Preparation Example 1 using the surface-treated anode support exhibits output that is higher by about 2 times than that of the cell (about 0.5 W) of Preparation Example 2 using the anode support that is not surface-treated.

Therefore, efficiency of the cell may be increased by the method of surface-treating the anode support according to the exemplary embodiment of the present application.

Although the exemplary embodiments of the present application are described with reference to the accompanying drawings, the present application is not limited to the exemplary embodiments but may be manufactured in various different forms, and it will be appreciated by those skilled in the art that various modifications and changes may be performed in other specific forms without departing from the technical spirit or essential feature of the application. Therefore, it should be understood that the above exemplary embodiments are illustrative in all aspects but are not limitative.

The invention claimed is:

1. An anode support of a solid oxide fuel cell comprising:
   a structure of a metal and an inorganic oxide having oxygen ion conductivity, the structure having a treated portion and a non-treated portion, the treated portion including a surface of the anode support that contacts an electrolyte, the structure being prepared by a press and sinter operation,
   wherein the surface of the treated portion that contacts the electrolyte has a plurality of pores such that the surface of the treated portion has a porosity of from 5% to 50%, each of the pores having a size from 0.1 micrometers to 1 millimeter, and
   wherein the treated portion occupies from 5% to 50% of a total volume of the anode support and comprises the inorganic oxide, and
   wherein the treated portion is a portion that has been treated by removing the metal using an acid.

2. The anode support of claim 1, wherein a roughness of the surface of the treated portion that contacts the electrolyte is 200 nanometers or more and 1,000 nanometers or less.

3. The anode support of claim 1, wherein an area specific resistance (ASR) of the surface of the treated portion that contacts the electrolyte is 0.01 $\Omega cm^2$ or more and 0.5 $\Omega cm^2$ or less.

4. The anode support of claim 1, wherein the porosity of the surface of the treated portion that contacts the electrolyte is from 35% to 50%.

5. The anode support of claim 1, wherein the treated portion occupies from 35% to 50% of the total volume of the anode support.

6. A method of manufacturing a solid oxide fuel cell, the method comprising:
   preparing the anode support of claim 1; and
   applying an inorganic oxide having ion conductivity on the treated surface of the treated portion the anode support to form the electrolyte.

7. The method of claim 6, wherein the inorganic oxide included in the electrolyte is the same as the inorganic oxide included in the anode support.

8. A solid oxide fuel cell comprising:
   the anode support of claim 1;
   a cathode positioned to face the anode support; and
   the electrolyte positioned between the anode support and the cathode.

9. The solid oxide fuel cell of claim 8, wherein a power density continuously increases according to current density across an entire range from 1.0 to 2.0 $A/cm^2$.

* * * * *